(No Model.)
M. BURTON & H. EBERHARDT.
ANIMAL TRAP.
No. 554,388. Patented Feb. 11, 1896.
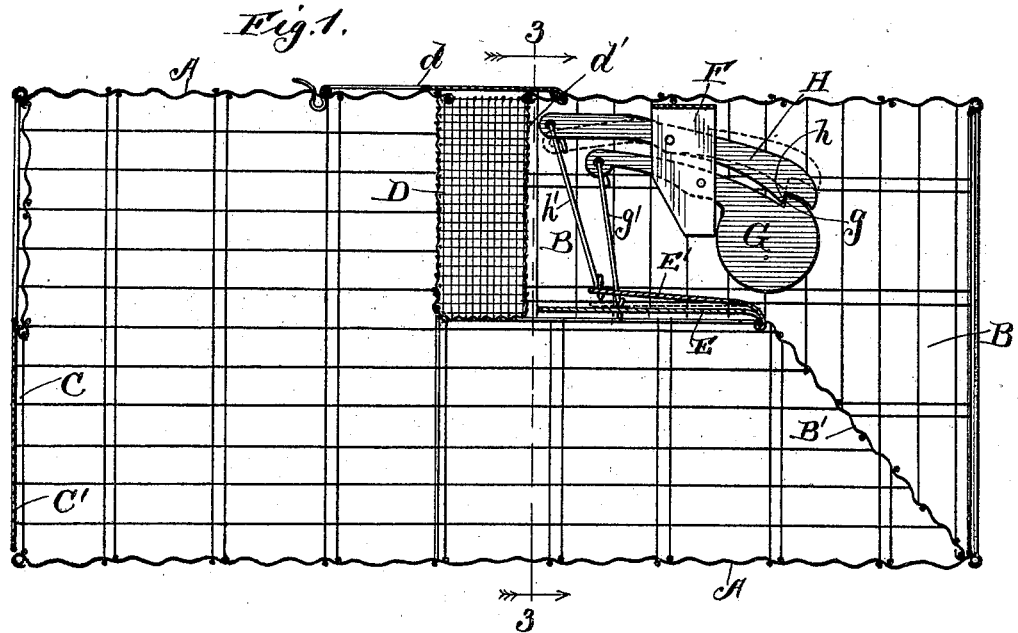
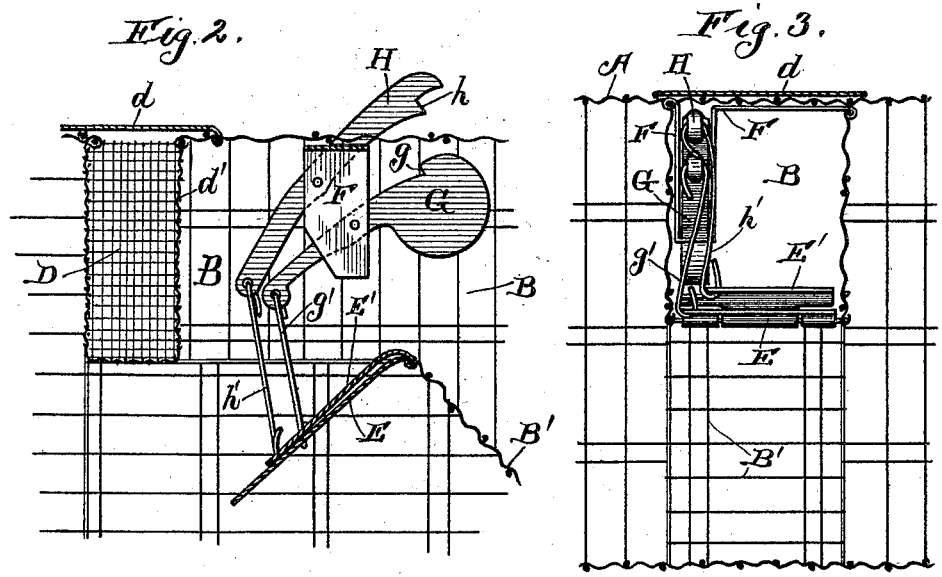
Witnesses:
R. J. Jacker.
O. A. Duggan.
Inventors
Matthew Burton
Henry Eberhardt.
By Chas. C. Tillman, Atty.

UNITED STATES PATENT OFFICE.

MATTHEW BURTON AND HENRY EBERHARDT, OF CHICAGO, ILLINOIS, ASSIGNORS TO THE GILBERT & BENNETT MANUFACTURING COMPANY, OF GEORGETOWN, CONNECTICUT.

ANIMAL-TRAP.

SPECIFICATION forming part of Letters Patent No. 554,388, dated February 11, 1896.

Application filed July 15, 1895. Serial No. 555,976. (No model.)

*To all whom it may concern:*

Be it known that we, MATTHEW BURTON and HENRY EBERHARDT, citizens of the United States, residing at Chicago, in the county of Cook and State of Illinois, have invented certain new and useful Improvements in Animal-Traps, of which the following is a specification.

This invention relates to improvements in traps for catching animals, and while it is more especially adapted for use in that class of traps made of wire and to be used for entrapping rats, yet it is also applicable to traps of other constructions, and for entrapping other animals; and it consists in certain peculiarities of the construction, novel arrangement and operation of the various parts thereof, as will be hereinafter more fully set forth and specifically claimed.

In the ordinary rat or animal traps in which tilting platforms are employed for entrapping the animals it has been found that owing to the great cunning of rats it is almost impossible to prevent them from escaping from the cage or trap by reason of the fact that they will pull down the platform by means of their claws and thus escape through the same opening through which they entered, or where precipitated by the incline of the platform.

It is therefore the object of our present invention to provide a simple and inexpensive means of locking the platform in its normal position, so that it cannot be liberated from beneath, yet will readily yield when entered upon and the weight of the animal is applied thereto on its upper surface.

In order to enable others skilled in the art to which our invention pertains to make and use the same, we will now proceed to describe it, referring to the accompanying drawings, in which—

Figure 1 is a longitudinal sectional view of the trap, showing the parts in their normal position. Fig. 2 is a fragmental view of a portion of the trap, showing the platforms and their levers in the positions they will occupy when pressed down by the weight of the animal on its ingress to the cage, and Fig. 3 is a cross-sectional view taken on line 3 3 of Fig. 1, looking in the direction of the arrows.

Similar letters refer to like parts throughout the different views of the drawings.

A represents the cage or receptacle, which is made of any suitable size, form, and material, but preferably rectangular and of wire, such as is generally used for rat or animal traps of the ordinary construction. This cage is provided with an ingress-opening B and an exit or outlet opening C, which latter is provided with a door or gate C' to close the same. The central upper portion of the cage and about the inner end of the ingress-opening B is provided with a food or bait receptacle D, which is open at its upper end to allow the bait to be inserted in the receptacle from the exterior of the cage, and is provided with a hinged cover $d$ to close the same. As shown in the drawings, the food-receptacle D is placed at the inner end of the passage-way B, and thus closes said passage when the platforms are in their normal positions. However, the bait-receptacle may be dispensed with or otherwise located, and one of its walls $d'$, or a similar wall, employed at the inner end of the passage-way. Within the passage-way B, which is generally formed with an inclined floor B', are pivoted at one of each of their ends platforms E and E', the former of which normally lies in a horizonal position and extends to near the wall $d'$ at the inner end of the passage-way, thus closing said passage, as is apparent by reference to Fig. 1 of the drawing. The platform or floor E' is likewise pivoted at its outer end and normally lies in substantially a horizontal position a slight distance above the platform or floor E. Above these floors or platforms E and E', and usually at one side thereof, are fulcrumed in a suitable bracket F, secured to the frame A of the cage, two levers G and H, which engage each other and lock the platform E in a horizontal position, as will be presently explained.

Each of the levers G and H are weighted or overbalanced at their free ends, and the lever G is formed with a catch or recess $g$ to engage the projection or catch $h$ on the lever H, which is connected at its other end by means of a rod or other suitable connecting device $h'$ to the upper floor or platform, E', while the inner end of the lever G is united by means of a connecting device $g'$ to the lower platform or floor, E, as is clearly shown in the drawings.

From the foregoing and by reference to the drawings it will be seen and readily understood that on entering the passage-way B the animal will place its feet on the upper platform or floor, E', which operation will liberate the catch $h$ on the lever H from the recess $g$ on the other lever, and will cause the lever H and platform E' to assume the positions indicated by dotted lines in Fig. 1, when both of the platforms will be free to be moved by the weight of the animal to the positions indicated in Fig. 2, when after the removal of the animal from the platforms the weighted levers will cause the platforms to return to their normal positions, (shown by continuous lines in Fig. 1 of the drawings,) and there be firmly secured against downward manipulation from the interior of the cage, and thereby preventing the escape of the animals.

It is apparent that the locking of the platforms is automatic and that the unlocking thereof is accomplished by the ingress of the animal through the passage-way.

Having thus fully described our invention, what we claim as new, and desire to secure by Letters Patent, is—

1. The combination with a cage or receptacle having an ingress opening or passageway, of a platform pivotally secured at one of its ends in said opening and comprising two floors one above the other, a weighted lever connected at one of its ends to the lower floor and provided on the upper surface of its other end with a catch or recess, and another weighted lever connected at one of its ends to the upper floor of the platform and provided on the lower surface of its other end with a catch to engage the catch on the first-named lever, substantially as described.

2. The combination with a cage or receptacle having an ingress opening or passage, of a bait-box located at the inner end of said passage, a platform pivotally secured at one of its ends in the passage-way and comprising two floors one above the other, a lever connected at one of its ends to the lower floor and provided with a catch or recess, and another lever connected at one of its ends to the upper floor and adapted to engage the catch of the lower lever, substantially as described.

3. The combination with a pivotal platform comprising two floors one above the other, of a lever connected to the lower floor and another lever connected to the upper floor and adapted to engage the first-named lever when the floors of the platform are in their normal positions, substantially as described.

4. In an animal-trap the combination with a cage or receptacle having an ingress-opening, of a platform located in said opening and comprising two floors one above the other, a weighted lever connected at one of its ends to the lower floor and provided near its other end with a catch or recess, and another weighted lever connected at one of its ends to the upper floor and adapted to engage the catch on the first-named lever at its other end, substantially as described.

MATTHEW BURTON.
HENRY EBERHARDT.

Witnesses:
CHAS. C. TILLMAN,
E. A. DUGGAN.